United States Patent [19]

Burgdorf

[11] Patent Number: 4,653,814
[45] Date of Patent: Mar. 31, 1987

[54] POWER BRAKE BOOSTER FOR A HYDRAULIC VEHICLE BRAKE SYSTEM

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 808,849

[22] Filed: Dec. 13, 1985

[30] Foreign Application Priority Data

Dec. 14, 1984 [DE] Fed. Rep. of Germany ....... 3445566

[51] Int. Cl.⁴ .......................... B60T 13/14; B60T 8/02
[52] U.S. Cl. ...................................... 303/52; 60/554; 303/114
[58] Field of Search .................................. 303/50–56, 303/114, 119, 113, 10–12, 116, 92; 60/554; 188/181 A, 11; 91/391 R

[56] References Cited

U.S. PATENT DOCUMENTS

| | | | |
|---|---|---|---|
| 4,286,826 | 9/1981 | Leiber | 303/114 |
| 4,318,272 | 3/1982 | Leiber et al. | 60/554 X |
| 4,346,942 | 8/1982 | Leiber | 303/114 X |
| 4,405,181 | 9/1983 | Resch et al. | 303/52 X |
| 4,489,989 | 12/1984 | Belart et al. | 303/114 X |
| 4,534,171 | 8/1985 | Leiber | 60/554 X |

FOREIGN PATENT DOCUMENTS 3110028 9/1982 Fed. Rep. of Germany ........ 60/554

Primary Examiner—Douglas C. Butler
Attorney, Agent, or Firm—James B. Raden; Donald J. Breh

[57] ABSTRACT

A power brake booster including booster pressure acting upon a booster piston and controlled by a brake valve which is actuated by an actuating element supported in the booster housing is disclosed. A travel simulator is interposed between the actuating element and the brake valve. Acting on which travel simulator is a simulator piston which is acted on by the actuating pressure in opposition to main actuating direction. The simulator piston is connected to a valve spool for the purpose of actuating the brake valve. The actuating element includes a plunger piston which projects into a booster chamber and which transmits a reaction force onto the actuating element on actuation of the power brake booster.

7 Claims, 3 Drawing Figures

POWER BRAKE BOOSTER FOR A HYDRAULIC VEHICLE BRAKE SYSTEM

The present invention relates to a power brake booster for use in a hydraulic vehicle brake system and which includes a brake valve connectable to a pressure fluid source and to an unpressurized reservoir, and serving to control the actuating pressure acting upon a booster piston. The booster is of the type including a master brake cylinder actuatable by the booster piston and an actuating element which can be acted upon by the actuating pressure in opposition to its actuating direction and which serves to actuate the brake valve and, on failure of the actuating pressure, the master brake cylinder.

In a known power brake booster of this type disclosed in the German printed and published patent application No. 33 38 322, the actuating element is supported in the booster piston and is displaceable in relation to the booster piston by the amount of the control travel for the purpose of control of the brake valve. Control of the brake valve in the booster housing is effected through a double lever which transmits a relative movement between the actuating element and the booster piston onto the valve spool of the brake valve. This power brake booster bears the disadvantage that the actuating travels of the actuating element and of the booster piston must be of the same amount. As a consequence of which the construction of the power brake booster is limited.

SUMMARY OF THE INVENTION

The present invention provides for a power brake booster of the type referred to, but wherein the actuating element is movable independently of the booster piston and its actuating travel is selective within specific limits depending on the particular application.

According to an important aspect of the present invention, a travel simulator is arranged in operative connection between the actuating element and the brake valve. Bearing against the travel simulator is a simulator piston which is acted upon by the actuating pressure in opposition to the actuating direction. The axial movement of the piston is transmitted onto the control element of the brake valve, whereby, a power brake booster is created in which the actuating travel of the actuating element can be determined by a travel simulator independently of the travel of the booster piston. Simultaneously, this provides for a simplification of the power brake booster construction since the travel simulator substitutes articulated transmission means such as, for example, the known double lever, for the transmission of the actuating movement onto the brake valve. Furthermore, the inventive power brake booster is characterized by small overall length and by an abrupt change in ratio on failure of the energy supply. The travel simulator provides for optimizing the force-travel characteristic curve of the booster and thus, provides feel of actuation to the operator independently of the booster function. Another advantage of the inventive power brake booster is provided in that the travel simulator transmits only part of the reaction force effective at the actuating elements, which contributes to simplified manufacture and minimum space requirements for mounting of the booster. This is the essential difference between the inventive power brake booster and other known brake-actuating devices which include a travel simulator.

An important feature of the inventive power brake booster provides for a short overall length in that the brake valve is accommodated in the booster housing in parallel relationship with the master brake cylinder. Also, the actuating element is supported in the booster housing coaxially to the master brake cylinder and includes a lateral arm on which the travel simulator abuts. With this arrangement, the travel simulator is also preferably arranged coaxially to the brake valve.

According to an advantageous feature of the invention, the travel simulator is located in a pressure chamber which is acted upon by the actuating pressure either inwardly or outwardly, respectively, and by the reservoir pressure on the respective other side and into which the effective area of the simulator piston projects. This feature of the travel simulator bears the advantage that the reaction forces are received by the pressure chamber so that the arm is loaded only by the control forces of the brake valve. Consequently, guidance of the actuating element remains substantially free from clamping forces, whereby precise actuating of the power brake booster is assured.

A still further feature of the invention provides that, on failure of the energy supply, the actuating element is relieved from the actuating forces of the travel simulator and of the brake valve. Accordingly, the brake valve is supported in the booster housing slidable in the actuating direction and is held in abutment on a stop in the booster housing by the pressure of the pressure fluid source in opposition to its actuating direction. On failure of the pressure fluid source, the brake valve is displaced by the actuating element without there being any necessity to compress the travel simulator.

Preferably, the brake valve is designed as a slide valve with a sleeve-shaped valve body which is inserted slidably into a bore in the booster housing and which contains annular grooves in its periphery and into which hydraulic connecting bores terminate.

According to another important feature of the invention, the actuating travel of the actuating element is confined by a slidable stop. With the power brake booster being at its maximum output, the resistance to displacement of the slidable stop is greater than the abutment force available in the operating point. A like stop serves to indicate to the driver that further increase of the braking effect is not possible. Preferably, the stop is provided at a partition piston which closes the booster chamber at the end of the master brake cylinder. This bears the advantage that the stop can be displaced easily on failure of the energy supply so that the actuating element is given a larger actuating travel in the event of direct mechanical actuation of the master brake cylinder. Furthermore, with the energy supply intact, this permits a displacement of the stop without increase of the abutting force when the actuating force has reached a very high amount so that the actuating element is able to perform an actuating travel without further force increase. Preferably, the displacing travel of the stop is confined by a stationary stop on the booster housing.

To generate a reaction force, the actuating element extends with a plunger piston through a bore in the partition piston into the booster chamber. This construction is particularly simple and provides an additional point of guidance for the actuating element so that any tendency of the actuating element's guidance to clamp is minimized. Additionally, this construction affords the advantage that the cross-section of the reaction surface may be varied by variation of plunger piston and partition piston alone.

The travel simulator preferably includes several helical compression springs arranged concentrically within one another. Preferably, the simulator has a progressive force-travel characteristic curve which, with increasing actuating force, gives the impression of the brake being applied.

BRIEF DESCRIPTION OF THE DRAWINGS

The present invention will be described in more detail hereinbelow in the Detailed Description Of The Preferred Embodiment in conjunction with the accompanying drawings in which.

DETAILED DESCRIPTION OF THE PREFERRED EMBODIMENT

Figure 1:
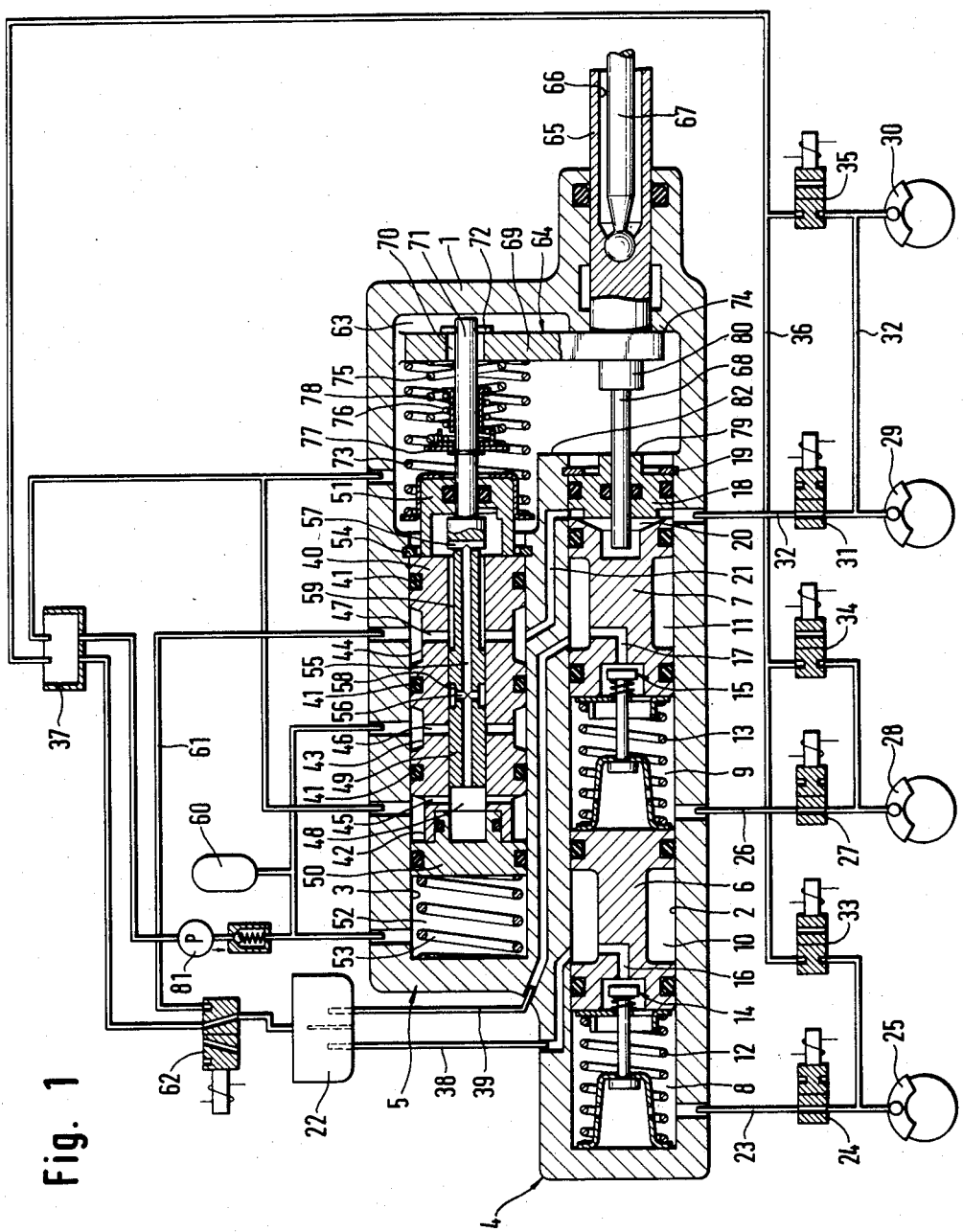
FIG. 1 is a cross-section of a power brake booster employing the principles of the invention shown connected to a hydraulic brake system with anti-skid control.

In the power brake booster illustrated in FIG. 1, a booster housing 1 accommodates in parallel bores 2, 3 a tandem master brake cylinder 4 and a brake valve 5. The tandem master brake cylinder 4 comprises two master cylinder pistons 6, 7 which subdivide the interior of the bore 2 into pressure chambers 8, 9 and supply chambers 10, 11. Compression springs 12, 13 keep the master cylinder pistons 6, 7 in the initial position illustrated with the brake released, in which position the central valves 14, 15 arranged in the master cylinder pistons 6, 7 are opened and the pressure chambers 8, 9 are in communication with the supply chambers 10, 11 via channels 16, 17. In the initial position, the master cylinder piston 7 bears against a partition piston 18 which closes the bore 2 and is held by a circlip 19. Disposed between the master cylinder piston 7 and the partition piston 18 is a booster chamber 20 which is connected to the brake valve 5 via a channel 21.

The supply chambers 10, 11 of the tandem master brake cylinder 4 communicate via separate lines 38, 39 each to a chamber of an intermediate reservoir 22 of the brake system. A brake line 23 leads from the pressure chamber 8 via a solenoid valve 24 that is open in its de-energized state to the left front-wheel brake 25 of a vehicle and a brake line 26 leads from the pressure chamber 9 via a solenoid valve 27 that is open in its de-energized state to the right front-wheel brake 28 of the vehicle. The two rear-wheel brakes 29, 30 are through a brake line 32 jointly connected to the booster chamber 20 via a solenoid valve 31 that is open in its de-energized state. Furthermore, the front-wheel brakes 25, 28 and the rear-wheel brake 29, 30 are connected to an unpressurized reservoir 37 through a brake line 36 via solenoid valves 33, 34, 35 which are also in their de-energized state.

The brake valve 5 comprises a sleeve-shaped valve body 40 which is slidably supported in the bore 3 and which is sealed in relation to the bore 3 by ring seals 41. Between the ring seals 41, the periphery of the valve body 40 contains annular grooves 42, 43, 44, wherefrom valve bores 45, 46, 47 lead radially, inwardly into a central bore 48, wherein a valve spool 49 is disposed. At its two ends, the central bore 48 is in each case pressure tightly closed by a bowl-shaped cover 50, 51. The edge of the cover 50 is sealed in relation to the bore 3 and isolates the annular groove 42 from a pressure chamber 52, in which a compression spring 53 is located which urges the valve body 40 against a stop ring 54.

The valve spool 49 contains a longitudinal bore 55 as well as cross bores 56, 57 terminating into the longitudinal bore 55 and interconnecting the two control grooves 58, 59 in the spool's periphery and the pressure chambers at both ends of the central bore 48.

The brake valve 5 is connected to the unpressurized reservoir 37 via the annular groove 42, to a pressure accumulator 60 via the annular groove 43 and to the booster chamber 20 via the annular groove 44. Additionally, a pressure line 61 leads from the annular groove 44 to the main valve 62. The pressure chamber 52 is likewise connected to the pressure accumulator 60 so that when the pressure accumulator is charged, the valve body 40 is urged against the stop ring 54.

For the purpose of actuation of the power brake booster, a housing chamber 63 adjacent to the bores 2, 3 houses an actuating element 64. The actuating element 64 includes a cylindrical rod 65 which is guided and sealed coaxially to the bore 2 in the booster housing 1 and which contains a bore 66 open towards the outside, wherein an actuating tappet 67 is secured by means of a spherical joint. Inside the booster housing 1, the end of the rod 65 is designed as plunger piston 68 which projects through a central bore in the partition piston 18, wherein it is sealed into the booster chamber 20.

To actuate the brake valve 5, a radially directed rigid arm 69 is secured to the rod 65 and includes coaxially to the longitudinal axis of the brake valve 5 a bore 70 extending through which is the rod-like end of a simulator piston 71 that penetrates the cover 51. The simulator piston 71 is coupled to the valve spool 49 and carries a locking pin 72 on the side of the arm facing away from the brake valve 5, which locking pin abuts on the arm 69. Located between the arm 69 and the cover 51 of the brake valve 5 is a restoring spring 73 which urges the arm 69 against a housing stop 74. Also, a travel simulator formed by two compression springs 75, 76 arranged concentrically, is placed between the arm 69 and the brake valve 5, the travel simulator transmitting the actuating force from the arm 69 onto the simulator piston 71. The two compression springs 75, 76 are supported on the simulator piston 71 and bear against a spring retainer 77 that is fastened to the simulator piston 71. In the inner, shorter compression spring 76 of the travel simulator, there is a stop sleeve 78 which restricts the amount the travel simulator is compressed.

The actuating travel of the actuating element 64 is further bounded by a stop 79 at the partition piston 18 which cooperates with a collar 80 of the actuating element 64. To this end, the travel simulator and the various actuating travels are dimensioned such that the collar 80 reaches the stop 79 when the power brake booster is at its maximum output.

The pressure accumulator 60 is charged by a pump 81 which takes the pressure fluid from the reservoir 37.

FIG. 1 displays the power brake booster and the brake system in their inactive position when the brake is released. With the exception of the pressure chamber 52 and the annular groove 43, which are in direct communication with the pressure accumulator 60, all chambers of the power brake booster and of the brake system are filled with unpressurized pressure fluid and are connected to the reservoir 37 for volume balance.

Upon actuation of the power brake booster, the actuating element 64 is moved in opposition to the force of the restoring spring 73 in the direction of the master brake cylinder 4 and the brake valve 5. This movement is likewise transmitted onto the valve spool 49 since the compression spring 75 of the travel simulator is preloaded with a force slightly exceeding the resistance to displacement of the valve spool 49. Before the end of the plunger piston 68 reaches the master cylinder piston 7, the valve spool 49 has closed the valve bores 45 and has partially opened the valve bores 46 so that pressure fluid out of the pressure accumulator 60 is allowed to propagate thorugh the valve bore 46 into the control groove 58 and from there, through the cross bore 56, the longitudinal bore 55, the cross bore 57, the control groove 59, the valve bores 47, the annular groove 44, and the channel 21, into the booster chamber 20 and any act upon the back side of the master cylinder piston 7. Thereby, the master cylinder piston 7 and, via the preloaded compression spring 13, the master cylinder piston 6 are displaced to the left and the central valves 14, 15 are closed. Subsequently, a pressure develops in the pressure chambers 8, 9 in dependence on the pressure rise in the booster chamber 20, which pressure actuates the front-wheel brakes 25, 28. Simultaneously, the rear-wheel brakes 29, 30 are actuated by the pressure generated in the chamber 20. The pressure introduced in the brake valve 5 and in the booster chamber 20 becomes effective at the simulator piston 71 and at the plunger piston 68, and generates as a result a reaction force at the actuating element 64 which is opposed to the actuating force and by which the driver is permitted to directly feel the extent of the actuation. If the reaction force exceeds the prevailing actuating force, the valve spool 49 will be slid backwards in the direction of its initial position by means of the pressure acting on the simulator piston 71 until the valve bores 46 are closed, and no further pressure fluid can be delivered.

During the actuating process, first, the compression spring 75 and, in the presence of higher pressures, additionally the compression spring 75 of the travel simulator, will be compressed by the pressure force acting upon the simulator piston 71. Corresponding to the compression of the compression springs 75, 76, the actuating element 64 can be displaced in the actuating direction, thus creating a feeling of actuation which corresponds to that in conventional brake systems. To this effect, the travel simulator is dimensioned such that the actuating travel of the actuating element 64 will always remain smaller than the corresponding actuating travel of the master cylinder piston 7, with the brake system intact, so that there is no contact between the master cylinder piston 7 and the plunger piston 68.

Figure 3:
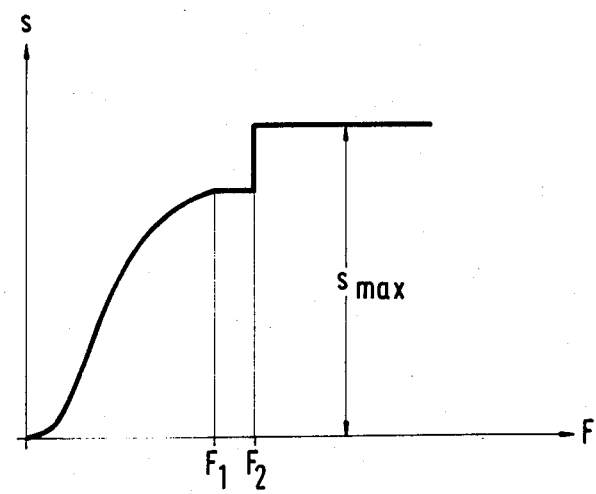
FIG. 3 is a force-travel diagram displaying the actuation characteristics of the power brake booster according to FIG. 1.

The ratio of the actuating travel S of the actuating element 64, which travel is produced by the compression of the travel simulator, to the force F, is illustrated in FIG. 3. At the force $F_1$, the travel simulator is compressed completely and the maximum output of the power brake booster is attained, i.e. the pressure introduced into the booster chamber 20 has reached the amount of the pressure in the pressure chamber 60. The travel simulator is dimensioned such that the collar 80 reaches the stop 79 at the partition piston 18 at the point of the booster's maximum output. If the actuating force continues to be increased until attainment of the magnitude $F_2$, the actuating element 64 will shift the partition piston 18 into the master brake cylinder 4, with the force constant, until the arm 69 has moved into abutment on the stationary stop 82 formed by the booster housing 1. Increase of the actuating pressure in the booster chamber 20 is not achieved by displacement of the partition piston 18 since the pressure fluid displaced is permitted to escape into the pressure accumulator 60 through the actuated brake valve.

When the actuating force at the actuating element 64 is reduced, the reaction forces of the plunger piston 68 and of the simulator piston 71, assisted by the force of the restoring spring 73, will move the actuating element 64 backwards in the direction of its initial position. The valve spool 49 will close the valve bore 46 and open the valve bore 45 so that pressure fluid out of the booster chamber 20 is permitted to take the way described hereinabove, into the longitudinal bore 55 and from there, via the central chamber 48, the valve bore 45, and the annular groove 42 to the unpressurized reservoir 37. The pressure in the brake system decreases and, when the actuating element 64 is completely relieved from load, all construction elements of the power brake booster will return to their illustrated initial position.

On failure of the energy supply by virtue of the pressure accumulator 60 and the pump 81, respectively, the master brake cylinder 4 can be actuated directly by way of the plunger piston 68 by the actuating element 64. Since no pressure is prevailing in the pressure chamber 52, the brake valve 5 will be displaced into the pressure chamber 52 via the restoring spring 73 in opposition to the force of the weaker compression spring 53 so that the actuation of the master brake cylinder 4 is not inhibited by the resistance of the travel simulator 74, 75. If the travel of the actuating element 64 to the stop 79 is not suffice to generate the necessary braking pressure, the partition piston 18 can be slid into the bore 2 without major resistance since the booster chamber 20 remains unpressurized as well. Hence, the entire actuating travel of the actuating element 64 up to the stationary stop 82 is available for the mechanical actuation of the master brake cylinder 4.

Consequently, both brake circuits of the tandem master brake cylinder 4 to the front-wheel brakes 25, 28 can be actuated on failure of the energy supply. Only actuation of the rear-wheel brakes 29, 30 is precluded. If the rear-wheel brakes 29, 30 are connected to the brake circuits of the tandem master brake cylinder 4, too, and the auxiliary energy controlled by the brake valve 5 is not utilized directly as a brake circuit, like in the embodiment shown, all brakes will remain actuatable on failure of the energy supply. Of course, the power brake booster described may likewise be equipped only with a one-circuit master brake cylinder for reasons of simplification as a result whereof its overall length is reduced. The booster circuit controlled by the brake valve 5 could then serve as second brake circuit, like in the embodiment described.

The power brake booster described is particularly adapted for a brake system with anti-skid control. To this end, a non-illustrated electronic control unit serves to monitor the vehicle wheels and to control the solenoid valves displayed in FIG. 1. Upon the occurrence of wheel lock, the main valve 62 will be switched and the pressure controlled by the brake valve 5 will be metered directly into the pressure chamber 8, 9 of the tandem master brake cylinder via the intermediate reservoir 22 with the central valves 14, 15 acting as nonreturn valves. The master cylinder pistons 6, 7 will then return in the direction of their initial position until the piston 7 has moved into abutment on the plunger piston 68. This provides for sufficient volume reserve for actuating the brake on failure of the control. By way of the solenoid valves 24, 27, 31, 33, 34, and 35, the braking pressure in the individual brake circuits can then be varied at will between zero and the introduced pressure by means of the electronic control unit for the purpose of preventing wheel-lock.

Figure 2:
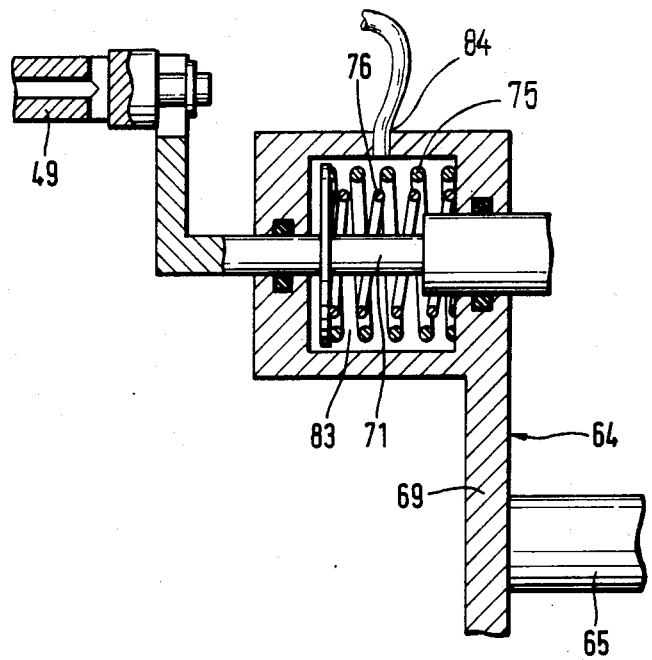
FIG. 2 is a cross-section through a travel simulator showing details of construction.

FIG. 2 depicts a variation of the travel simulator which avoids the occurrence of clamping forces at the actuating element 64. In this arrangement, the compression springs 75 and 76 are disposed in a pressure chamber 83 designed at the arm 69, into which chamber the introduced actuating pressure of the power brake booster will be supplied through a connection 84 and line (only a portion of which is shown). The simulator piston 71 is designed as a stepped piston axially penetrating the pressure chamber 83, its stepped surface being placed in the pressure chamber 83. In the event of pressure build up, the compression springs 75, 76 will be compressed by the displacing simulator piston 71, while the reaction force is received by the wall of the pressure chamber without loading the actuating element 64. Therefore, the arm 69 is required to merely receive the comparatively small resistance to displacement of the brake valve 5 so that the guidance of the actuating element 64 remains largely free from clamping forces. As the reaction force of the simulator piston 71 does not become effective at the actuating element 64, the plunger piston 68 is required to be dimensioned correspondingly larger in this configuration of the travel simulator.

What is claimed is:

1. A power brake booster for a vehicle hydraulic brake system comprising:
    a housing including a master cylinder bore and a brake valve bore;
    at least one master cylinder piston in said master cylinder bore;
    a booster piston in said master cylinder bore defining a booster chamber;
    a slide-type brake valve including a valve body slidably mounted in said brake valve bore and a valve spool slidably mounted inside said valve body, said valve connectable to a pressure fluid source, an unpressurized fluid reservoir and to said booster chamber, said brake valve adapted to control flow of said pressurized fluid to said booster chamber, said valve spool including a simulator piston acted upon by said pressurized fluid in a direction opposite to a brake actuating direction of said valve spool;
    a brake valve actuating element connectable to a brake pedal moveable in a brake released direction and a brake actuating direction;
    an actuator restoring spring surrounding said simulator piston supported on opposite ends thereof by said actuating element and by said valve body respectively;
    a travel simulator including at least one simulator spring surrounding said simulator piston positioned concentrically within said restoring spring and supported on opposite ends thereof by said actuating element and said simulator piston respectively.

2. The power brake booster as claimed in claim 1, wherein said actuating element includes a laterally extending arm including an aperture, said restoring spring and said at least one simulator spring being supported by said arm, said simulator piston slidably extends through said aperture.

3. The power brake booster as claimed in claim 2, wherein said actuator element further includes a plunger extending through a partition piston in said master cylinder bore into said booster chamber.

4. The power booster as claimed in claim 3, wherein said partition piston defines a sliding stop engaged by said actuating element at a point of maximum pressure output of said brake valve.

5. The power booster as define in claim 4 further including, a stationary stop engaged by said actuating element in a maximum actuating travel position of said actuating element.

6. The power booster as defined in claim 1, wherein said brake valve body and a closed end of said brake valve bore define a pressure chamber, said pressure chamber being in constant hydraulic communication with said pressurized fluid source, and
    a compression spring having a bias force less then a bias force of said restoring spring is supported in said pressure chamber between said closed end of said valve bore and said valve body, said compression spring biasing said valve body in a direction toward said travel simulator against a stationary stop extending into said brake valve bore in a released position of said brake booster.

7. A power brake booster for a vehicle hydraulic brake system comprising:
    a housing including a master cylinder bore and a brake valve bore;
    at least one master cylinder piston in said master cylinder bore;
    a booster piston in said master cylinder bore defining a booster chamber;
    a brake valve in said brake valve bore including a valve body slidably mounted in said brake valve bore and a valve spool slidably mounted in said valve body, said brake valve connectable to a pressure fluid source, an unpressurized reservoir and to said booster chamber, said brake valve adapted to control an actuating flow of said pressurized fluid to said booster chamber, said valve spool including a simulator piston;
    an actuating element operatively connected to a brake pedal for movement in a brake released direction and a brake actuating direction, said actuating element including an extending arm defining a closed pressure chamber connected to receive said controlled actuating flow of pressurized fluid from said brake valve,
    said simulator piston slidably, sealingly extending into said pressure chamber and being acted upon by said controlled actuating flow in a direction opposite to the actuating direction of said actuating element, and
    at least one travel simulator spring in said closed pressure chamber supported at one end by said actuating element and at a second end by said simulator piston.

* * * * *